(12) United States Patent
Kokubu (10) Patent No.: US 7,475,683 B2
(45) Date of Patent: Jan. 13, 2009

(54) FUEL INJECTION CONTROL DEVICE FOR A VARIABLE-FUEL ENGINE AND ENGINE INCORPORATING SAME

(75) Inventor: Shiro Kokubu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/903,047

(22) Filed: Sep. 20, 2007

(65) Prior Publication Data

US 2008/0072878 A1 Mar. 27, 2008

(30) Foreign Application Priority Data

Sep. 25, 2006 (JP) .............................. 2006-259501

(51) Int. Cl.
*F02D 41/30* (2006.01)
(52) U.S. Cl. .................... 123/672; 123/478; 123/436; 701/105; 701/109
(58) Field of Classification Search ......... 123/435–436, 123/672, 674, 703, 679, 687, 478, 486; 701/103–105, 701/108–110
See application file for complete search history.

(56) References Cited

U.S. PATENT DOCUMENTS

| 4,391,253 | A | * | 7/1983 | Ito ........................ 123/406.44 |
| 5,150,301 | A | * | 9/1992 | Kashiwabara et al. ....... 701/106 |
| 5,158,063 | A | * | 10/1992 | Hosoda et al. .............. 123/676 |
| 5,170,763 | A |   | 12/1992 | Kitajima et al. |
| 5,172,676 | A | * | 12/1992 | Imamura ..................... 123/682 |
| 5,183,021 | A | * | 2/1993 | Suga et al. .................. 123/478 |
| 5,233,944 | A |   | 8/1993 | Mochizuki |
| 5,941,217 | A |   | 8/1999 | Cheng et al. |
| 6,820,596 | B2 | * | 11/2004 | Namari et al. .............. 123/501 |
| 6,975,933 | B2 | * | 12/2005 | Abe et al. ................... 701/109 |
| 7,007,685 | B2 | * | 3/2006 | Ichihashi .................... 123/703 |
| 7,209,826 | B2 | * | 4/2007 | Abe et al. ................... 701/109 |

FOREIGN PATENT DOCUMENTS

JP 63-005131 1/1988

* cited by examiner

*Primary Examiner*—Hai H Huynh
(74) *Attorney, Agent, or Firm*—Carrier, Blackman & Associates, P.C.; William D. Blackman; Joseph P. Carrier (57) ABSTRACT

A fuel injection control apparatus, for a variable-fuel engine, includes a plurality of stored maps for determining a basic fuel injection time corresponding to a state of an engine and alcohol concentration in the fuel. The apparatus includes a memory storage region which stores the fuel injection control maps. The apparatus also includes an oxygen sensor disposed in an exhaust pipe for detecting oxygen concentration in an exhaust gas; a basic fuel injection time calculator which determines the basic fuel injection time using the currently selected fuel injection control map; a correction coefficient calculator which determines an air-fuel ratio correction coefficient for correcting the basic fuel injection time; a fuel injection quantity calculator; and a map changeover part which selects the fuel injection control map of the concentration of alcohol close to the concentration of alcohol of the fuel based on the air-fuel ratio correction coefficient.

9 Claims, 7 Drawing Sheets

FIG.6

FUEL INJECTION CONTROL DEVICE FOR A VARIABLE-FUEL ENGINE AND ENGINE INCORPORATING SAME

CROSS-REFERENCE TO RELATED APPLICATIONS

The present application claims priority under 35 USC §119 based on Japanese patent application No. 2006-259501, filed on Sep. 25, 2006. The entire subject matter of this priority document is herein incorporated by reference.

BACKGROUND OF THE INVENTION

1. Field of the Invention

The present invention relates to a fuel injection control device used in a variable-fuel engine which can be operated with an essentially pure alcohol fuel, with a fuel produced by mixing gasoline and alcohol in a variable ratio, or with normal gasoline fuel.

2. Description of the Background Art

Recently, there has been developed an FFV (Flexible Fuel Vehicle) which mounts a variable-fuel engine thereon, wherein the variable-fuel engine is operable either with essentially pure alcohol (ethanol) fuel, with a fuel which is produced by mixing gasoline and alcohol in a variable ratio, or with normal gasoline as a fuel.

Due to the difference in a stoichiometric mixture coefficient with respect to oxygen in combustion compared with gasoline, alcohol, along with the increase of the concentration of alcohol in the fuel, requires the supply of a larger quantity of fuel for the same intake quantity and power output.

Accordingly, in such a variable-fuel engine, a control operation is performed, for correcting a basic fuel injection time in response to the concentration of alcohol in the fuel, in order to obtain an optimum air-fuel ratio (for example, see published patent document JP-A-63-5131).

Here, the concentration of alcohol in the fuel is estimated based on an air-fuel ratio correction coefficient which is obtained using a detection value of an oxygen sensor (hereinafter referred to as "$O_2$ sensor") which measures the concentration of oxygen contained in an exhaust gas.

However, in the conventional control method, the basic fuel injection time is, for example, obtained by measuring an engine rotary speed and an intake pressure and, thereafter, by retrieving maps based on the measured values of the engine rotary speed and the intake pressure.

Accordingly, even when the concentration of alcohol in the fuel is changed, the basic fuel injection time is the value which is preliminarily set with respect to the engine rotary speed and the intake pressure and hence, there has been a drawback that an adjustment range of a fuel injection quantity with respect to the concentration of alcohol is narrow.

The present invention has been made under such drawbacks, and it is an object of the present invention to provide a fuel injection control apparatus for a variable-fuel engine, which includes a plurality of maps for determining a basic fuel injection time in response to a state of an engine, and changes over the maps in response to the concentration of alcohol.

SUMMARY OF THE INVENTION

To overcome the above-mentioned drawback, the fuel injection control apparatus for a variable-fuel engine according to a first aspect of the present invention is configured to include: a memory storage medium (for example, a memory region 26 in an embodiment) which stores a plurality of fuel injection control maps in which a state of an engine and a basic fuel injection time are made to correspond to each other in response to the concentration of alcohol contained in the fuel; an alcohol concentration determination mechanism (for example, a correction coefficient determination part 24 in the embodiment) which effectively detects the concentration of alcohol contained in the fuel; a map selector (for example, a map changeover part 21 in the embodiment) which selects the optimum fuel injection control map from the plurality of fuel injection control maps stored in the memory storage medium in response to the concentration of alcohol detected by the alcohol concentration detector; and a fuel injection quantity calculator (for example, a fuel injection quantity determination part 25 in the embodiment) which determines the basic fuel injection time using the currently selected fuel injection control map of the concentration of alcohol out of the plurality of fuel injection control maps stored in the memory storage medium in response to a state of the engine, and determines a fuel injection quantity based on the basic fuel injection time.

Further, a fuel injection control apparatus for a variable-fuel engine according to a second aspect of the present invention is configured to include: a memory storage medium (for example, a memory region 26 in an embodiment) which stores a plurality of fuel injection control maps in which a state of an engine and a basic fuel injection time are made to correspond to each other in response to the concentration of alcohol contained in the fuel; an oxygen sensor (for example, an $O_2$ sensor 15 in the embodiment) which is arranged in an exhaust pipe and detects the oxygen concentration in an exhaust gas; a basic fuel injection control time calculator (for example, a basic fuel injection control time determination part 22 in the embodiment) which determines the basic fuel injection time using the currently selected fuel injection control map of the concentration of alcohol out of the plurality of fuel injection control maps stored in the memory storage medium; an air-fuel ratio correction coefficient calculator (for example, a correction coefficient determination part 24 in the embodiment) which determines an air-fuel ratio correction coefficient for correcting the basic fuel injection time such that an air-fuel ratio of the engine becomes a target air-fuel ratio in response to a detection value of the oxygen sensor; a fuel injection quantity calculator (for example, a fuel injection quantity determination part 25 in the embodiment) which determines a fuel injection quantity based on the basic fuel injection time determined by the basic fuel injection time calculator and the air-fuel ratio correction coefficient determined by the air-fuel ratio correction coefficient calculator; and a map selector (for example, a map changeover part 21 in the embodiment) which selects the fuel injection control map of the concentration of alcohol close to the concentration of alcohol of the fuel based on the air-fuel ratio correction coefficient.

A fuel injection control apparatus for a variable-fuel engine according to the first and second aspects of the present invention may be configured to include: an intake pipe absolute pressure sensor which is arranged in an intake pipe and detects an intake pressure; and an engine rotary speed sensor (for example, a crank angle sensor 16 and an engine rotary speed detection part 23 in the embodiment) which detects an engine rotary speed, wherein the basic fuel injection time is determined based on an air quantity determined based on the intake pressure and the engine rotary speed as a state of the engine.

Here, the fuel injection control apparatus for a variable-fuel engine according to the first and second aspects of the present invention may be configured such that the fuel injection control apparatus for a variable-fuel engine includes a throttle opening sensor which detects throttle opening of a throttle valve, and the memory storage medium may include a set of fuel injection control maps (for example, a map set 40 in the embodiment) consisting of a Pb map which is the fuel injection control map in which the intake pressure, the engine rotary speed and the basic fuel injection time are made to correspond to each other and a throttle map which is the fuel injection control map in which the throttle opening, the engine rotary speed and the basic fuel injection time are made to correspond to each other for every alcohol concentration, and the fuel injection control apparatus for a variable-fuel engine is configured to selectively use either one of the Pb map and the throttle map selected corresponding to the concentration of alcohol in response to the state of the engine.

The fuel injection control apparatus for a variable-fuel engine according to the first and second aspects of the present invention may be configured such that the memory storage medium stores fuel injection control maps which correspond to at least three different concentrations of alcohol.

ADVANTAGE OF THE INVENTION

By constituting the fuel injection control apparatus for a variable-fuel engine according to the first and second aspects of the present invention in the above-mentioned manner, the basic fuel injection time can be changed corresponding to the concentration of alcohol contained in the fuel and hence, an adjustment range of the fuel injection quantity with respect to the concentration of alcohol is broadened whereby even when the concentration of alcohol contained in the fuel is changed, the engine can be operated in a stable manner. Particularly, according to the fuel injection control apparatus for a variable-fuel engine of the second aspect of the present invention, the concentration of alcohol contained in the fuel can be estimated based on the air-fuel ratio correction coefficient and hence, it is unnecessary to provide the alcohol concentration sensor in the inside of the fuel tank thus achieving the reduction of a cost of the fuel engine fuel injection control device.

Here, by constituting the fuel injection control apparatus for a variable-fuel engine such that the basic fuel injection time can be determined based on the intake pressure and the engine rotary speed, it is particularly possible to stabilize the engine rotary speed in the vicinity of the idling rotation. Further, by providing the set consisting of the fuel injection control map which determines the basic fuel injection time based on the intake pressure and the engine rotary speed and the fuel injection control map which determines the basic fuel injection time based on the throttle opening and the engine rotary speed and by changing over these maps in response to the state of the engine, it is possible to ensure the stability at the time of idling and to enhance the response at the time of a high load.

Here, by storing the environment correction coefficient table based on the intake temperature, the atmospheric pressure, the engine cooling water temperature and the like corresponding to at least three or more concentrations of alcohol or the map set which can obtain the favorable operation performance by changing over the acceleration correction, it is possible to operate the engine with the map set which stores the operation of the engine as it is until the next starting and a changeover control of the map set is performed and the maps on the environment correction coefficient, acceleration correction and the ignition timing.

DETAILED DESCRIPTION OF ILLUSTRATIVE EMBODIMENTS

Figure 1:
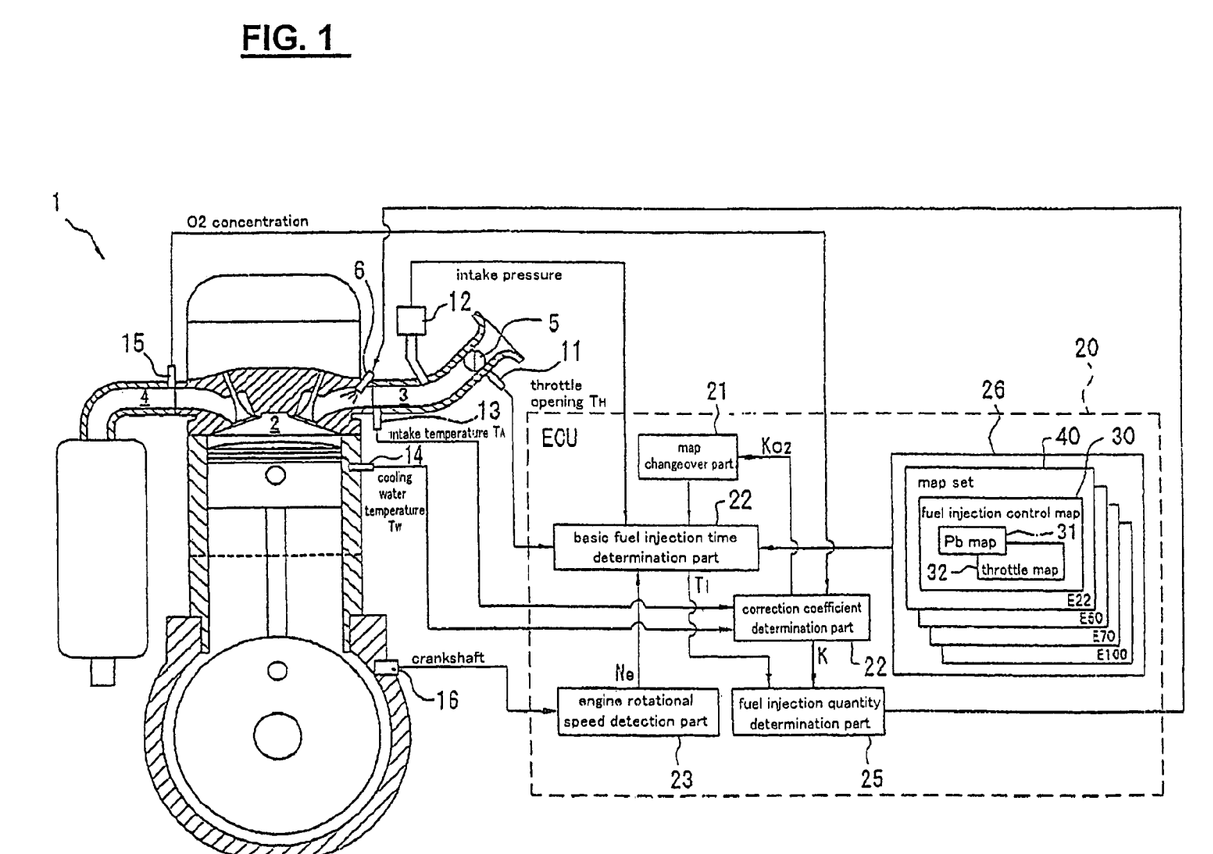
FIG. 1 is a block diagram showing the constitution of an engine to which a fuel injection control device of the present invention is applied.

Hereinafter, a preferred embodiment of the present invention is explained in conjunction with drawings. In FIG. 1, an engine 1 includes an intake pipe 3 and an exhaust pipe 4 which are communicated with a combustion chamber 2. A throttle valve 5 which adjusts a quantity of intake air and an injector 6 which injects fuel are mounted on the intake pipe 3. Further, the engine 1 mounts a throttle opening sensor 11 which detects the opening of the throttle valve 5, an intake pipe absolute pressure sensor 12 which detects a pressure (an intake pressure) in the inside of the intake pipe 3, an intake temperature sensor 13 which detects a temperature of air which flows in the combustion chamber 2 through the intake pipe 3 (intake temperature), a water temperature sensor 14 which detects a temperature of cooling water which flows in a water jacket formed in a cylinder head and a cylinder block of the engine 1 and cools these parts (water temperature), an $O_2$ sensor 15 which is mounted on the exhaust pipe 4 and detects the oxygen concentration of an exhaust gas discharged from the combustion chamber 2, and a crank angle sensor 16 which detects a rotational angle (a crank angle) of a crankshaft thereon. Detection values of these sensors are inputted to an engine control unit (ECU) 20 and an injection quantity of fuel from the injector 6 is controlled by the ECU 20 based on the detection values from these sensors. Here, in this embodiment, although the explanation is made with respect to a case in which the engine 1 is a water-cooled engine, the same control is applicable to an air-cooled engine.

Next, a method for determining the fuel injection quantity by the ECU 20 is explained. The engine 1 adopts a speed density method as an air quantity detection method. That is, an air mass in an operation state is determined based on an engine rotary speed Ne which is obtained by counting pulse signals outputted from the crank angle sensor 16 using an engine rotary speed detection part 23 of the ECU 20 and an intake pressure Pb in the inside of the intake pipe 3 detected by the intake pipe absolute pressure sensor 12, and a required fuel injection quantity for obtaining a predetermined target air-fuel ratio (usually a theoretical air-fuel ratio) which is empirically obtained under a standard atmospheric condition and a standard warming state is determined corresponding to the air mass in an operation state, and a valve opening time of the injector 6 for supplying the fuel injection quantity (hereinafter referred to as "basic fuel injection time Ti" in the explanation made hereinafter) is determined. To be more specific, the memory storage medium 26 (ROM or the like) of the ECU 20 stores a fuel injection control map 30 which is a two-dimensional map in which, using the intake pressure Pb and the engine rotary speed Ne as factors, the respective basic fuel injection times corresponding to these factors are set, and allows the basic fuel injection time determination part 22 to obtain the corresponding basic fuel injection time Ti based on the above-mentioned detection values.

In this manner, the basic fuel injection time Ti which is stored in the fuel injection control map 30 is empirically obtained by determining the atmospheric condition and hence, when the atmospheric condition under which the engine 1 is operated differs, it is difficult to obtain the target air-fuel ratio. Accordingly, the ECU 20 is configured to correct the basic fuel injection time Ti in response to such an environmental condition. As such an environment correction term, an intake temperature correction coefficient $K_{TA}$ which corrects a change amount of air density attributed to a change of the intake temperature TA and the intake temperature correction coefficient $K_{TA}$ is obtained by a correction coefficient determination part 24 of the ECU 20 based on the intake temperature TA detected by the intake temperature sensor 13.

Further, the engine 1 is required to be driven under various conditions and it is necessary to correct the target air-fuel ratio such that an optimum result is obtained in any operation condition. As such a target air-fuel ratio correction term, a water temperature correction coefficient $K_{TW}$ which prevents a phenomenon that the combustion becomes unstable due to the lowering of the temperature of the engine 1 thus lowering drivability, or a full open correction coefficient $K_{WOT}$ for realizing an output air-fuel ratio when the engine 1 is requested to generate a large torque during a high-rotation and high-load operation is named. The ECU 20 is configured to correct the basic fuel injection time Ti based on these correction coefficients. Here, the water temperature correction coefficient $K_{TW}$ is obtained by the correction coefficient determination part 24 of the ECU 20 based on the water temperature TW of the cooling water detected by the water temperature sensor 14, while the full open correction coefficient $K_{WOT}$ is obtained by the correction coefficient determination pan 24 based on the throttle opening TH detected by the throttle opening sensor 11.

Further, such an engine 1 is provided with a three-dimensional catalyst for oxidizing carbon hydride and carbon monoxide contained in the exhaust gas or for reducing nitrogen oxide contained in the exhaust gas. To make full use of a purifying ability of the three-dimensional catalyst, it is necessary to accurately maintain the air-fuel ratio in the engine 1 at the theoretical air-fuel ratio. A feed-forward control such as the above-mentioned environment correction term or target air-fuel ratio correction term cannot satisfy such a control. Accordingly, the correction coefficient determination part 24 of the ECU 20 obtains an air-fuel ratio correction coefficient $KO_2$ for maintaining the theoretical air-fuel ratio based on the oxygen concentration in the inside of the exhaust pipe 4 detected by the $O_2$ sensor 15 and corrects the basic fuel injection time Ti by a feedback control.

From the above, a fuel injection time Tout after correction can be obtained by a following equation (1).

$$Tout = Ti \times K_{TA} \times K_{WOT} \times K_{TW} \times KO_2 \qquad (1)$$

Figure 6:
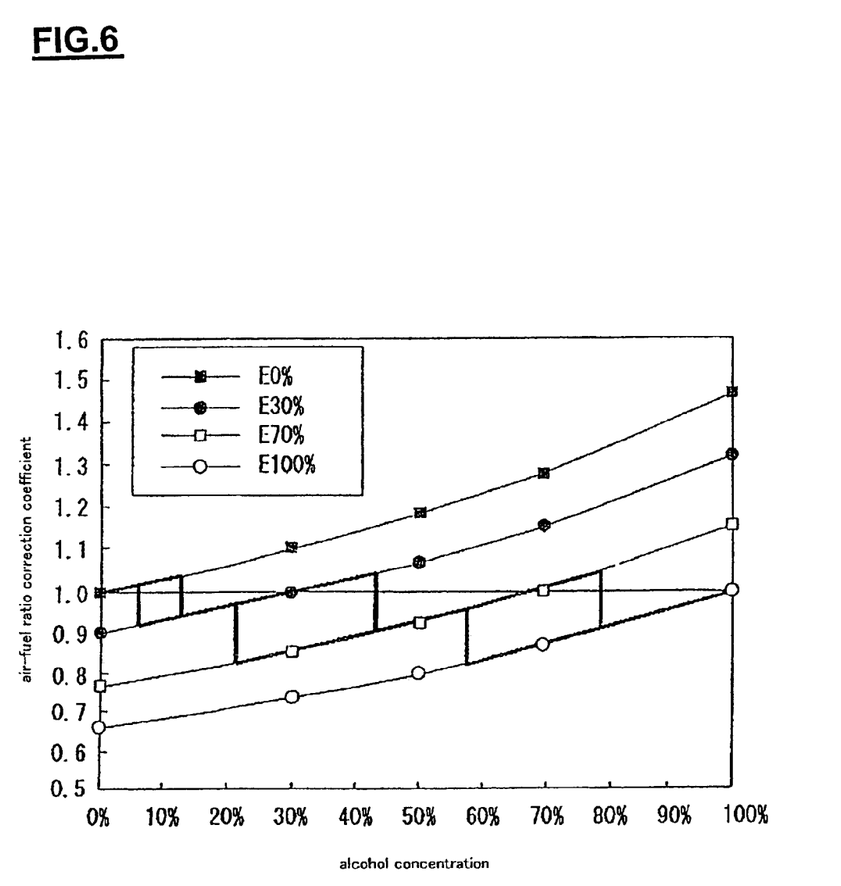
FIG. 6 is a graph showing a relationship between alcohol concentration and an air-fuel ratio correction coefficient for every map set.

Here, in case of fuel produced by mixing alcohol into gasoline or fuel made of only alcohol, as mentioned above, due to the difference in stoichiometric mixture coefficient, alcohol requires a larger quantity of fuel than gasoline for the same intake quantity. Accordingly, when the air-fuel ratio correction coefficient $KO_2$ is large, this implies a state that the fuel injection quantity is small, that is, a state that alcohol concentration is rich, while when the air-fuel ratio correction coefficient $KO_2$ is small, this implies a state that the fuel injection quantity is large, that is, a state that alcohol concentration is lean. As shown in FIG. 6, it is known that the concentration of alcohol contained in the fuel and the air-fuel ratio correction coefficient $KO_2$ are substantially proportional to each other. Accordingly, the ECU 20 of this embodiment is configured to store a plurality of fuel injection control maps 30 corresponding to different alcohol concentrations, and to select the optimum fuel injection control map 30 in response to the value of the air-fuel ratio correction coefficient $KO_2$.

Figure 2:
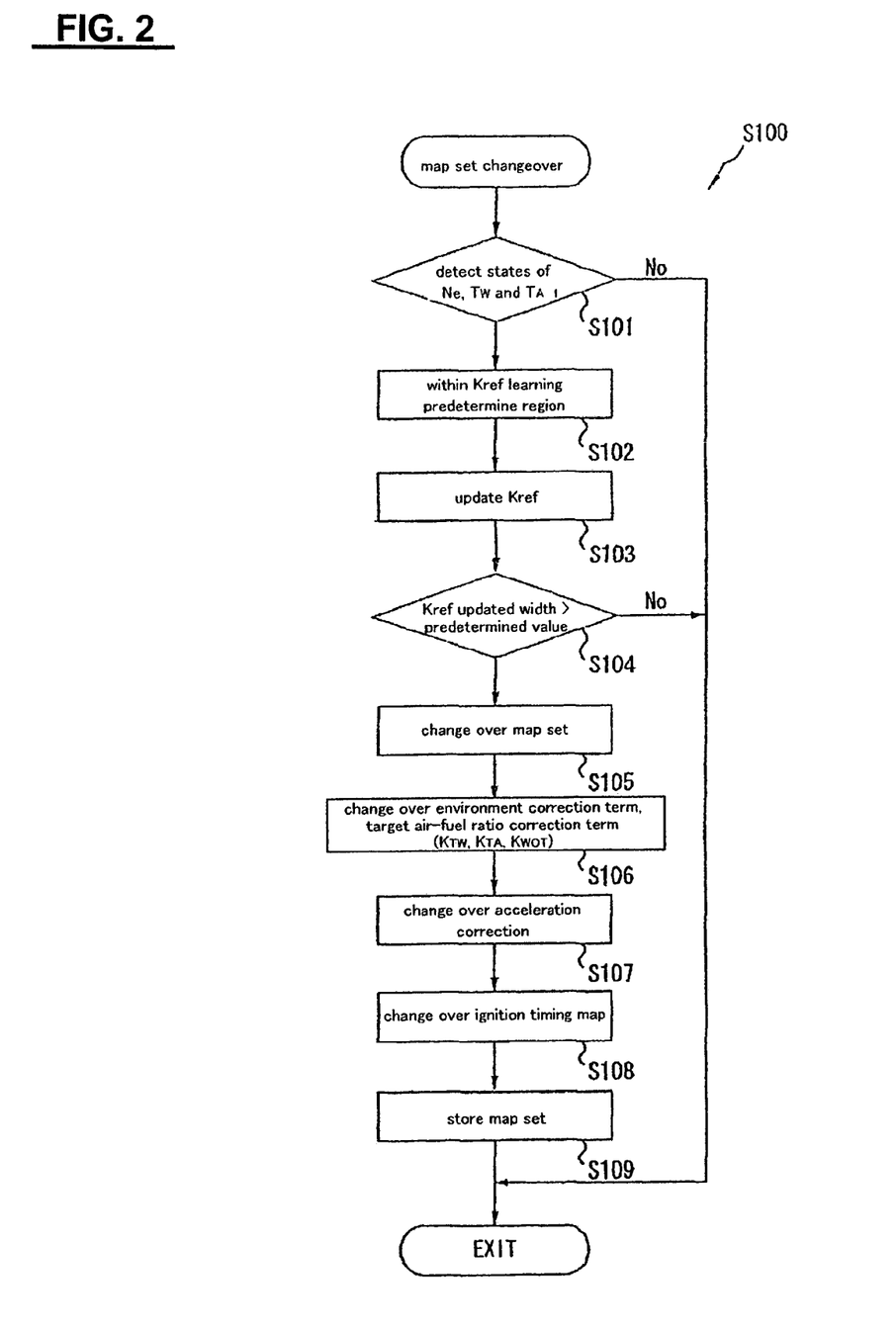
FIG. 2 is a flow chart showing a content of map set changeover processing.

Next, the map set changeover processing S100 by a map changeover part 21 of the ECU 20 is explained in conjunction with FIG. 2. Here, in the explanation made hereinafter, the fuel injection control map 30 corresponding to alcohol concentration is referred to as a map set 40. In this embodiment, the explanation is made with respect to a case which includes four sets of map sets 40 consisting of the map set in which the alcohol concentration is 0% with respect to the whole fuel (hereinafter referred to as "E0 map set"), the map set in which the alcohol concentration is 30% with respect to the whole fuel (hereinafter referred to as "E30 map set"), the map set in which the alcohol concentration is 70% with respect to the whole fuel (hereinafter referred to as "E70 map set"), and the map set in which the alcohol concentration is 100% with respect to the whole fuel (hereinafter referred to as "E100 map set").

Further, in this embodiment, corresponding to the above-mentioned fuel injection control maps 30 corresponding to the alcohol concentrations, that is, corresponding to the map sets 40 (E0 to E100), the correction coefficients such as the environment correction term $K_{TA}$, the target air-fuel ratio correction terms ($K_{TW}$, $K_{WOT}$), the acceleration correction, the fuel injection quantity at the time of starting, ignition timing and the like are stored in the memory region 26. By also changing over these correction coefficients and the like corresponding to the alcohol concentrations at the time of changing over the map set 40, the more favorable fuel supply and combustion control are performed. Such a constitution is explained hereinafter.

Figure 3:
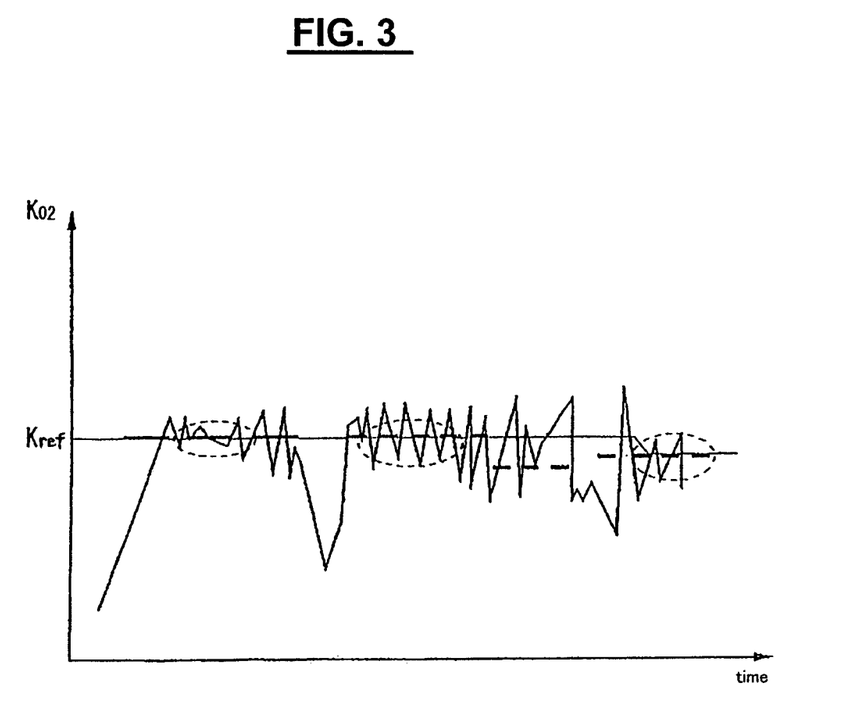
FIG. 3 is an explanatory view showing a relationship between behavior of an air-fuel ratio correction coefficient and an average learning coefficient.

In this embodiment, while the alcohol concentration is estimated based on the air-fuel ratio correction coefficient $KO_2$, during the operation of the engine 1, the air-fuel ratio correction coefficient $KO_2$ fluctuates as shown in FIG. 3 due to the change with time of the engine 1 or the external influence. Accordingly, in map set changeover processing S100, an average learning value Kref of the air-fuel ratio correction coefficient $KO_2$ is obtained, and the map set 40 is selected based on the average learning value Kref. When this map set changeover processing S100 is executed, first of all, the map set changeover part 21 reads signals from the respective sensors and calculates the engine rotary speed Ne, the intake temperature TA and the water temperature TW or detects an activated state of the $O_2$ sensor 15, and determines whether succeeding processing is to be continued or not based on these states (step S1O1). To be more specific, when a fluctuation width of the engine rotary speed Ne exceeds a predetermined set range, and the intake temperature TA and the water temperature TW are lower than predetermined values, or when the $O_2$ sensor 15 is not in an activated state, the determination of changeover of the map set 40 is not performed and the processing is finished. On the other hand, when the engine rotary speed Ne, the intake temperature TA and the water temperature TW satisfy the predetermined conditions, as a next step, it is confirmed whether the average learning coefficient Kref is within a predetermined learning region or not (step S102).

Then, for a predetermined time, the value of the air-fuel ratio correction coefficient $KO_2$ is subject to average processing integrally thus updating the average learning coefficient Kref (step S103). For example, assuming the previous-time average learning coefficient as $Kref_{n-1}$ and this-time air-fuel ratio correction coefficient as $KO_{2n}$, this-time average learning coefficient $Kref_n$ is obtained by an equation (2) and this processing is repeated for a predetermine time (predetermined cycles). Here, in the equation (2), β indicates an averaging coefficient and is usually set to approximately 0.1.

$$Kref_n = \beta \cdot KO_{2n} + (1-\beta) \cdot Kref_{n-1} \quad (2)$$

It is determined whether the average learning coefficient Kref of the air-fuel ratio correction coefficient updated in this manner $Kref_n$ obtained finally in step S103) exceeds an upper limit of the map set 40 which is set now or equal to or below a lower limit or not (step S104). If the average learning coefficient Kref is within a range, the processing is finished as it is (Accordingly, the currently selected map set 40 is used for calculating the basic fuel injection time Ti). On the other hand, if the average learning coefficient Kref exceeds the upper limit, the map set 40 is changed over to the map set 40 having the higher alcohol concentration (one-stage higher map set: for example, the E70 map set when the current map set is the E30 map set), and if the average learning coefficient Kref is equal to or below the lower limit, the map set 40 is changed over to the map set 40 having the lower alcohol concentration (one-stage lower map set: for example, the E0 map set when the current map set is the E30 map set).

Figure 4:
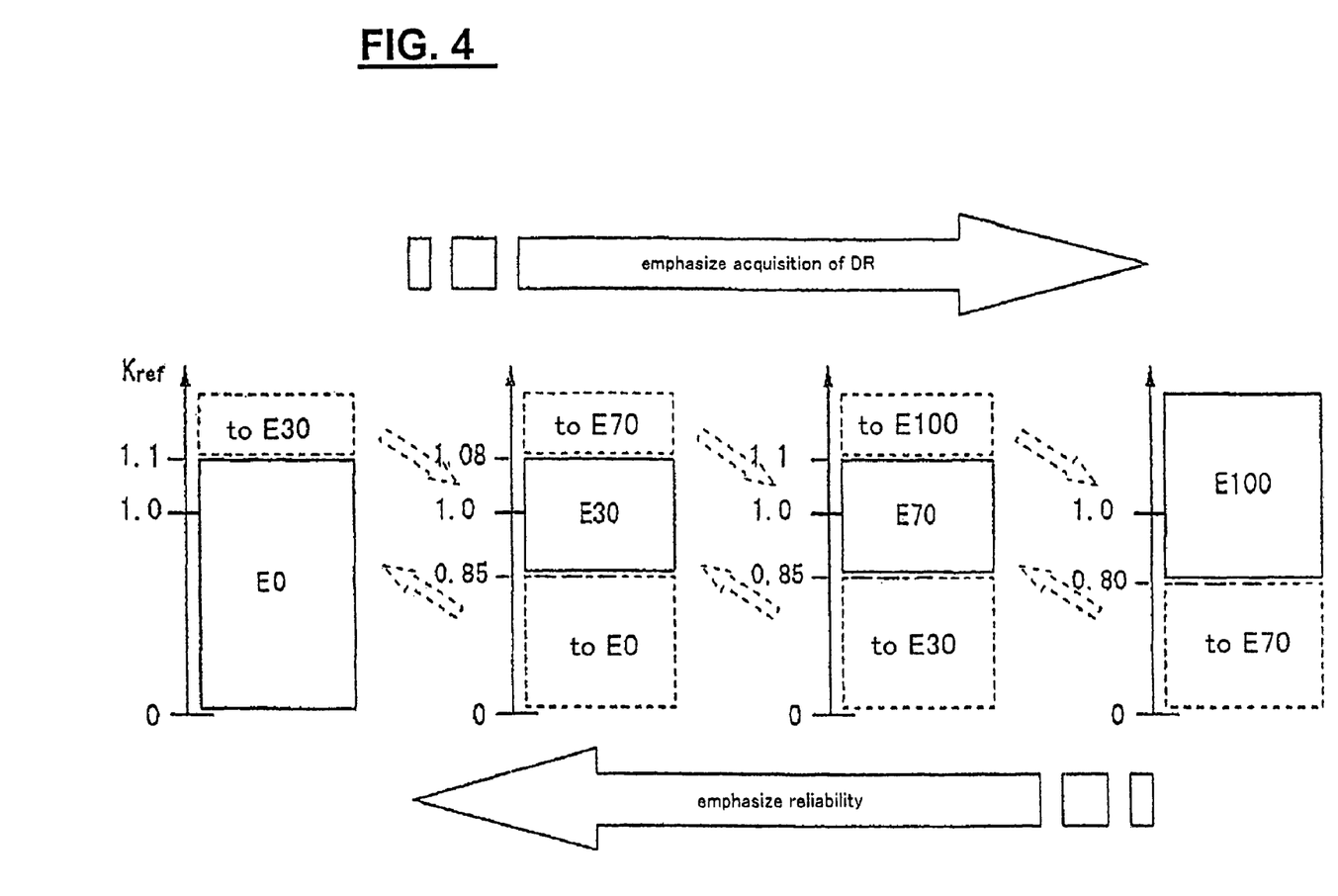
FIG. 4 is an explanatory view showing the changeover of a map set based on an average learning coefficient.

Here, the map sets 40 (E0 to E100) set the upper and lower limits of the average learning coefficient Kref respectively individually by setting the average learning coefficient Kref of 1.0 (the average learning coefficient Kref being equal to the target air-fuel ratio, that is, the selected map set 40 being equal to the alcohol concentration) as the center. For example, as shown in FIG. 4, in the E0 map set, 1.1 is set as the upper limit value. In the E30 map set, 1.08 is set as the upper limit value and 0.85 is set as the lower limit value. In the E70 map set, 1.1 is set as the upper limit value and 0.85 is set as the lower limit value. In the E100 map set, 0.80 is set as the lower limit value. Here, even when the map set 40 (fuel injection control maps 30) is changed over to make the air-fuel ratio rich, there is little possibility that drivability is deteriorated. However, when the map set 40 (fuel injection control maps 30) is changed over to make the air-fuel ratio lean, there is possibility that drivability is deteriorated and hence, the upper limit value of the average learning value Kref is set to emphasize the acquisition of drivability and the lower limit value of the average learning value Kref is set to emphasize the acquisition of reliability.

Further, in the same manner as the changeover of the map set 40, depending on whether the average learning value Kref exceeds or equal to or below the lower limit value, the environment correction term or the target air-fuel correction term is changed over (step S106), the acceleration correction is changed over (step S107) or the ignition timing map is changed over (step S108). Then, the map set 40 which is selected in this manner in response to the alcohol concentration is stored in the memory region 26 (step S109). By storing the selected map set 40 in the memory ragion 26 of the ECU 20, in the next starting, the map set 40 when the previous-time engine 1 is stopped is used and hence, it is possible to supply the proper starting injection fuel quantity.

Figure 5:
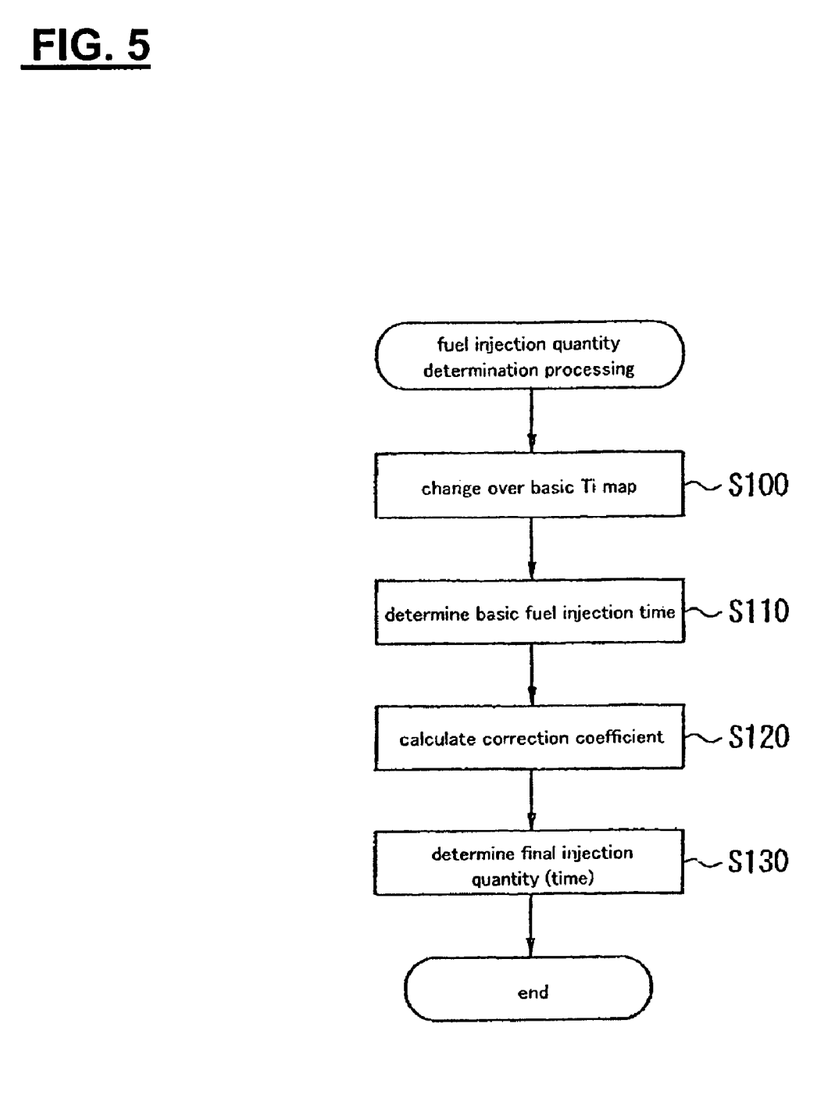
FIG. 5 is a flow chart showing a method for determining a fuel injection quantity.

As described above, the determination of the fuel injection quantity (time) in the ECU 20 is performed in accordance with the processing shown in FIG. 5. First of all, the map changeover part 21 executes the above-mentioned map set changeover processing S100 to perform the determination whether the map set 40 is changed over or not (step S100). Then, using the fuel injection control map 30 of the map set 40 determined in this manner, the basic fuel injection time determination part 22 determines the basic fuel injection time Ti based on the engine rotary speed Ne and the intake pressure Pb (step S110). Further, the correction coefficient determination part 24 calculates the above-mentioned correction coefficients (intake temperature correction coefficient $K_{TA}$, water temperature correction coefficient $K_{TW}$, full open correction coefficient $K_{WOT}$, air-fuel ratio correction coefficient $KO_2$ (or average learning coefficient Kref) (step S120). Finally, the fuel injection quantity determination part 25 calculates the fuel injection time Tout after correction using the above-mentioned equation (1), determines the final fuel injection quantity (time) by taking the injection invalid time or the like into consideration, and control the injector 6 (step S130).

Here, when the engine 1 is started by turning on a main switch, the ECU 20 performs the initial setting, performs the fail determination by reading the sensor outputs. Thereafter, in the above-mentioned step S109, the ECU 20 reads the map set 40 which is finally stored in the memory region 26 and, at the same time, reads the injection quantity at the time of starting, the environment correction term, the target air-fuel ratio correction term, the acceleration correction, the ignition timing map corresponding to the map set 40 from the memory region 26 thus determining the fuel injection quantity, and the engine 1 is operated. Further, thereafter, as mentioned above, the ECU 20 detects the intake temperature TA, the water temperature TW, the engine rotary speed Ne and the throttle opening TH and, at the same time, detects the activated state of the $O_2$ sensor 15, determines whether the map set 40 is to be changed over or not based on such a state, and in a stage that the condition is satisfied, the map set 40 is changed over by the above-mentioned processing and the engine 1 is operated.

As has been explained above, by storing the plurality of map sets 40 (E0 to E100) which are the sets of the fuel injection control maps 30 corresponding to the alcohol concentrations and by changing over the map set 40 in response to the air-fuel ratio correction coefficient $KO_2$ (average learning coefficient Kref), as shown in FIG. 6, it is possible to select the optimum fuel injection control map 30 in response to the alcohol concentration (mixing ratio) (the air-fuel ratio correction coefficient $KO_2$ being controlled to assume a value in the vicinity of 1.0 (region surrounded by a bold solid line in FIG. 6). Accordingly, it is also possible to decrease the correction quantity (the above-mentioned correction coefficient) with respect to the basic fuel injection time Ti which is selected from the fuel injection control map 30. Accordingly, the displacement of the correction quantity attributed to the difference in the operation condition can be reduced and hence, the more accurate air-fuel ratio can be realized. Particularly, in the above-mentioned manner, by adopting the fuel injection control map which uses the intake pressure and the engine rotary speed as references based on the speed density method (hereinafter being referred to as "Pb map 31") as the fuel injection control map 30, the engine rotation in the vicinity of the idling rotary speed of the engine 1 can be stabilized.

Further, in the above-mentioned embodiment, the explanation is made with respect to the case in which four sets of map sets (map sets E0 to E100) are set in response to the concentration of alcohol contained in the fuel. However, the number of map sets 40 is not limited to four. For example, the number of map sets 40 may be three in response to the enhancement of relative accuracy such as a flow rate error of the injector 6 or other system error, for example.

Here, in the above-mentioned explanation, the explanation is made with respect to the case which adopts the speed density method as the air quantity detection method. However, a speed throttle method may be used together with the speed density method, and the fuel injection control maps 30 which correspond to the respective methods may be changed over. Here, the speed throttle method is a method in which a necessary fuel injection quantity for acquiring a predetermined target air-fuel ratio which is empirically obtained under a certain atmospheric condition is determined corresponding to an air mass in an operation state which is determined based on an engine rotary speed Ne and a throttle opening TH detected by the throttle opening sensor 11, and a valve opening time (basic fuel injection time Ti) of the injector 6 for supplying the fuel injection quantity is determined. The speed throttle method can obtain a high response with respect to the opening of the throttle valve 5. Also in this speed throttle method, the throttle opening TH and the engine rotary speed Ne are used as factors, and a fuel injection control map 30 (also referred to as "throttle map 32") which is a two-dimensional map in which respective basic fuel injection times corresponding to these factors are set is stored in the memory region 26 of the ECU 20. Accordingly, a set of the Pb map 31 and the throttle map 32 corresponding to preset alcohol concentration are, in the case of the above-mentioned embodiment, stored in the ECU 20 corresponding to four map sets 40 of E0 to E100.

Figure 7:
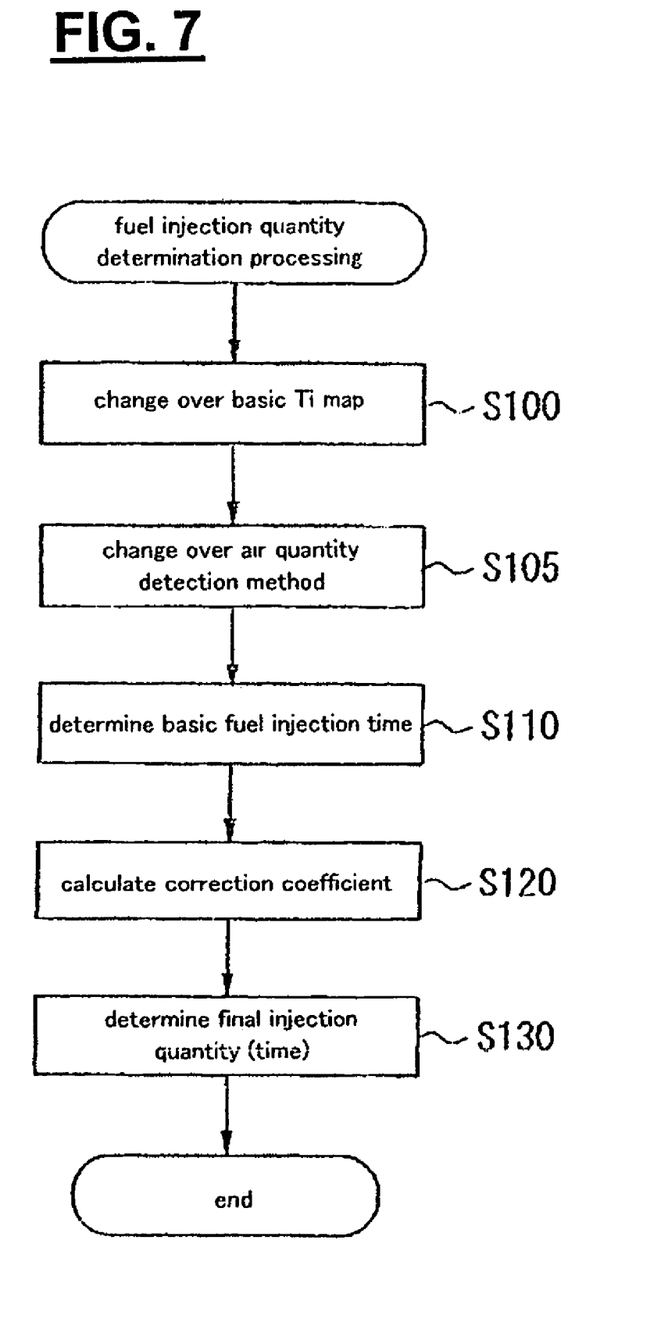
FIG. 7 is a flow chart showing a method for determining a fuel injection quantity when a speed density method and a speed throttle method are used in combination.

In this manner, the determination of the fuel injection quantity (time) in the ECU 20 when the speed density method and the speed throttle method are used in combination is performed in accordance with the processing shown in FIG. 7. First of all, in the same manner as the case shown in FIG. 5, the above-mentioned map set changeover processing 100 is executed to perform the determination whether the map set (E0 to E100 maps) 40 corresponding to the alcohol concentration is changed over or not (step S100). Further, it is determined which one of the speed density method and the speed throttle method is selected as the air quantity detection method corresponding to the operation state (step S105). For selecting the air quantity detection method, the speed density method (fuel injection control map which uses the intake pressure and the engine rotary speed as references) is selected at the time of idling, at the time of fixed speed, at the time of gentle acceleration or deceleration, and at the time of a low load, and the speed throttle method (fuel injection control map which uses the throttle opening and the engine rotary speed as references) is selected at the time of rapid acceleration or deceleration or at the time of a high load. Then, in the map set 40 determined in step S100, the basic fuel injection time Ti is determined using the fuel injection control map 30 (Pb map 31 or throttle map 32) corresponding to the intake quantity detection method selected in step S105 (step S110).

Further, the above-mentioned correction coefficients (intake temperature correction coefficient $K_{TA}$, water temperature correction coefficient $K_{TW}$, full open correction coefficient $K_{WOT}$, air-fuel ratio correction coefficient $KO_2$ (or average learning coefficient Kref) are calculated (step S120). Finally, the fuel injection quantity determination part 25 calculates the fuel injection time Tout after correction using the above-mentioned equation (1), determines the final fuel injection quantity (time) by taking the injection invalid time or the like into consideration, and control the injector 6 (step S130).

In this manner, by changing over the air quantity detection method and by changing over the Pb map 31 and the throttle map 32 corresponding to the changeover of the air quantity detection method, it is possible to realize the supply of more accurate fuel quantity using the high accurate regions in the respective fuel injection control maps 30 and, at the same time, it is possible to acquire the rapid traceability of fuel injection quantity corresponding to the movement of the throttle from a partial region to a full open state. Accordingly, the stability at the time of idling or the like can be ensured and, at the same time, a response at the time of a high load can be enhanced.

Here, in the above-mentioned embodiment, the air-fuel ratio correction coefficient $KO_2$ is used for determination of alcohol concentration. However, an alcohol concentration sensor may be mounted on the engine 1. Still further, instead of changing the environment correction term, the target air-fuel ratio correction term, the acceleration correction, the fuel injection quantity at the time of starting, the ignition timing and the like corresponding to the alcohol concentration, preset values may be used (in this case, steps S106 to S108 in FIG. 2 being not executed).

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A fuel injection control apparatus for a variable-fuel engine, said apparatus comprising:
    a memory storage medium which stores a plurality of fuel injection control maps in which a state of an engine is related to a basic fuel injection time in response to a concentration of alcohol contained in the fuel;
    an alcohol concentration sensor which detects the concentration of alcohol contained in the fuel;
    a map changeover selector for selecting a currently applicable fuel injection control map from the plurality of fuel injection control maps stored in the memory storage medium in response to the concentration of alcohol detected by the alcohol concentration sensor; and
    a fuel injection time calculator which determines a currently applicable basic fuel injection time using the currently selected fuel injection control map in response to a state of the engine, where a quantity of fuel injected is proportional to the basic fuel injection time;
    wherein the injection time calculator is operable to update a correction factor according to the formula $Kref_n = \beta \times KO_{2n} + (1-\beta) \times Kref_{n-1}$;
    where $Kref_n$ represents a currently applicable learning coefficient;
    $\beta$ represents an averaging coefficient;
    $KO_{2n}$ represents an air-fuel ratio correction coefficient related to the concentration of alcohol present in the fuel; and
    $Kref_{n-1}$ represents a recently applied learning coefficient.

2. A fuel injection control apparatus for a variable-fuel engine according to claim 1, further comprising:
    an intake pipe absolute pressure sensor which is arranged in an intake pipe and detects an intake pressure; and an engine speed sensor which detects a rotary speed of the engine, wherein the basic fuel injection time is determined based on an air quantity determined based on the intake pressure and the engine rotary speed as a state of the engine.

3. A fuel injection control apparatus for a variable-fuel engine according to claim 2, wherein the fuel engine injection control device includes a throttle opening sensor which detects throttle opening of a throttle valve, and the memory storage medium includes a set of fuel injection control maps consisting of a Pb map which is the fuel injection control map in which the intake pressure, the engine rotary speed and the basic fuel injection time are made to correspond to each other and a throttle map which is the fuel injection control map in which the throttle opening, the engine rotary speed and the basic fuel injection time are made to correspond to each other for every alcohol concentration, and the fuel injection control apparatus for a variable-fuel engine is configured to selectively use either one of the Pb map and the throttle map selected corresponding to the concentration of alcohol in response to the state of the engine.

4. A fuel injection control apparatus for a variable-fuel engine according to claim 1, wherein the memory storage medium stores the fuel injection control maps which correspond to at least three or more different concentrations of alcohol.

5. A fuel injection control apparatus for a variable-fuel engine, said apparatus comprising:

a memory storage medium which stores a plurality of fuel injection control maps in which a state of an engine is related to a basic fuel injection time in response to a concentration of alcohol contained in the fuel;

an oxygen sensor which is arranged in an exhaust pipe and detects an oxygen concentration in an exhaust gas;

a basic fuel injection time calculator which determines a currently applicable basic fuel injection time using a currently selected fuel injection control map of the concentration of alcohol;

an air-fuel ratio correction coefficient calculator which determines an air-fuel ratio correction coefficient for correcting the basic fuel injection time, such that an air-fuel ratio of the engine becomes a target air-fuel ratio in response to input from the oxygen sensor;

a fuel injection quantity calculator which determines a fuel injection quantity based on the basic fuel injection time determined by the basic fuel injection time calculator and the air-fuel ratio correction coefficient determined by the air-fuel ratio correction coefficient calculator; and a map selector which selects the currently applicable fuel injection control map of the concentration of alcohol close to the concentration of alcohol of the fuel based on the calculated air-fuel ratio correction coefficient;

a controller which is operable to update a correction factor for the basic fuel injection time according to the formula $Kref_n = \beta \times KO_{2n} + (1-\beta) \times Kref_{n-1}$;

where $Kref_n$ represents a currently applicable learning coefficient;

$\beta$ represents an averaging coefficient;

$KO_2$ represents the air-fuel ratio correction coefficient; and $Kref_{n-1}$ represents a recently applied learning coefficient.

6. A fuel injection control apparatus for a variable-fuel engine according to claim 5, further comprising:

an intake pipe absolute pressure sensor which is arranged in an intake pipe and detects an intake pressure; and an engine rotary speed sensor which detects an engine rotary speed, wherein the basic fuel injection time is determined based on an air quantity determined based on the intake pressure and the engine rotary speed as a state of the engine.

7. A fuel injection control apparatus for a variable-fuel engine according to claim 6, wherein the fuel engine injection control device includes a throttle opening sensor which detects throttle opening of a throttle valve, and the memory storage medium includes a set of fuel injection control maps consisting of a Pb map which is the fuel injection control map in which the intake pressure, the engine rotary speed and the basic fuel injection time are made to correspond to each other and a throttle map which is the fuel injection control map in which the throttle opening, the engine rotary speed and the basic fuel injection time are made to correspond to each other for every alcohol concentration, and the fuel injection control apparatus for a variable-fuel engine is configured to selectively use either one of the Pb map and the throttle map selected corresponding to the concentration of alcohol in response to the state of the engine.

8. A fuel injection control apparatus for a variable-fuel engine according to claim 5, wherein the memory storage medium stores the fuel injection control maps which correspond to at least three or more different concentrations of alcohol.

9. A method of controlling injection of a fuel mixture into an internal combustion engine, the mixture containing alcohol in a range of 0-100 percent of the mixture, along with gasoline in a range of 0-100 percent of the mixture, said method comprising the steps of:

determining a relative content of alcohol and gasoline in the mixture, using an alcohol concentration sensor;

selecting a currently applicable fuel injection control map from the plurality of fuel injection control maps stored in a memory storage medium in response to the concentration of alcohol detected by the alcohol concentration sensor;

determining a currently applicable basic fuel injection time using the currently selected fuel injection control map in response to a state of the engine; and correcting the basic fuel injection time via a learning process according to the formula $Kref_n = \beta \times KO_{2n} + (1-\beta) \times Kref_{n-1}$;

where $Kref_n$ represents a currently applicable learning coefficient;

$\beta$ represents an averaging coefficient;

$KO_{2n}$ represents an air-fuel ratio correction coefficient related to the concentration of alcohol present in the fuel; and $Kref_{n-1}$ represents a recently applied learning coefficient.

* * * * *